Aug. 9, 1966 E. W. MADSEN 3,265,911
LINEAR ELECTRIC MOTOR
Filed Jan. 27, 1964 4 Sheets-Sheet 1
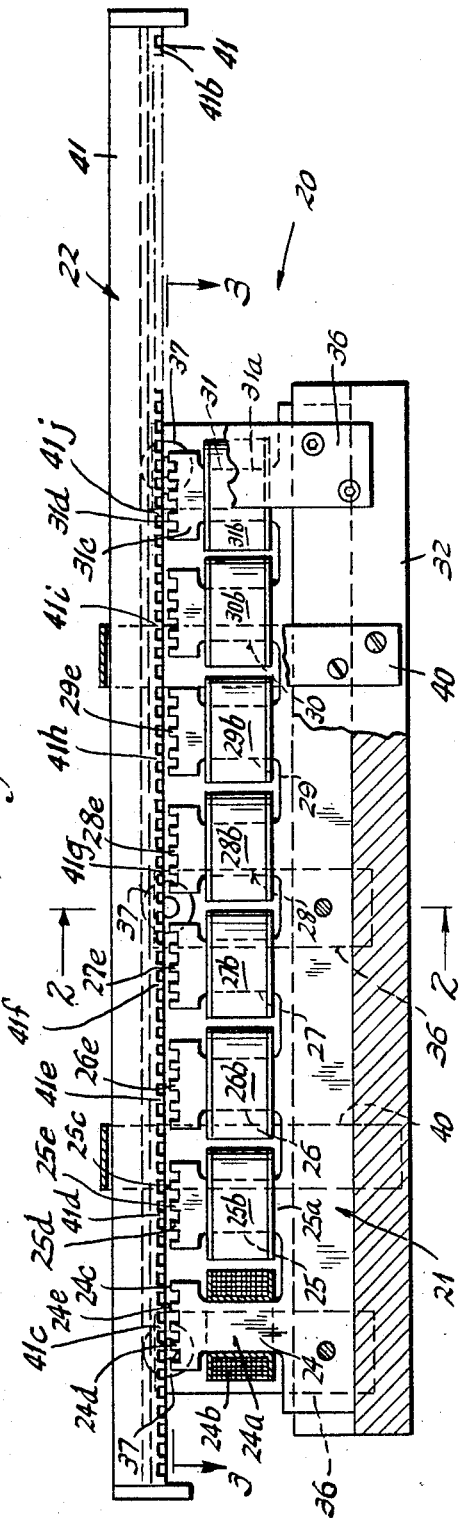
INVENTOR.
Elmer W. Madsen
BY
Johnson and Kline
ATTORNEYS Aug. 9, 1966     E. W. MADSEN     3,265,911
LINEAR ELECTRIC MOTOR
Filed Jan. 27, 1964     4 Sheets-Sheet 2
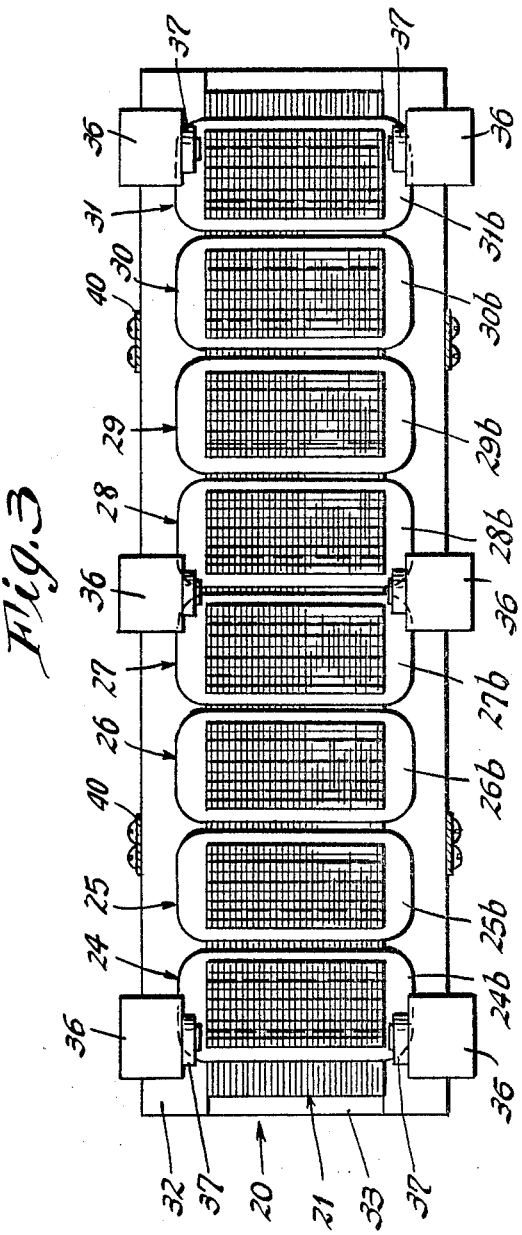
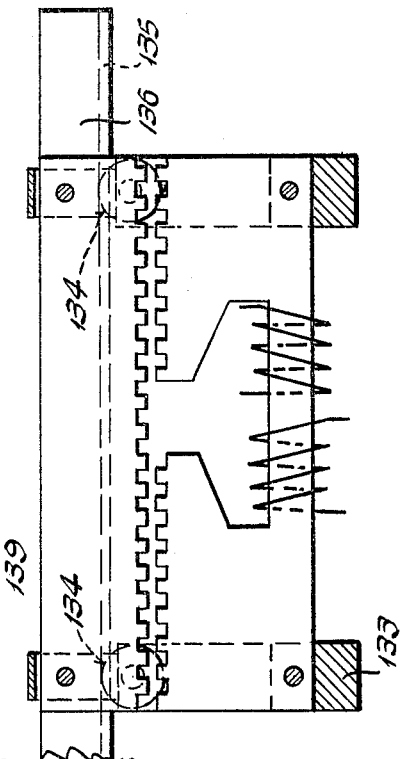
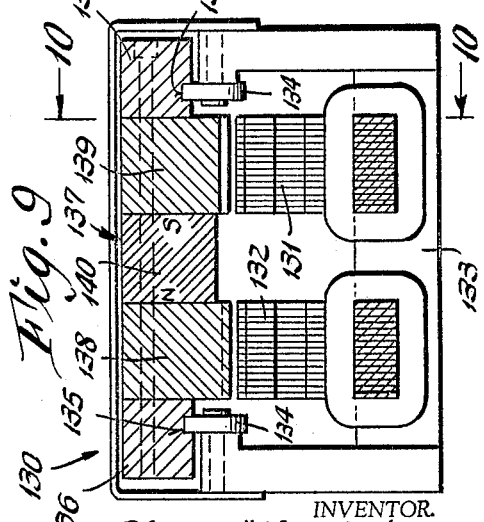
INVENTOR.
Elmer W. Madsen
BY
Johnson and Kline
ATTORNEYS INVENTOR.
Elmer W. Madsen
BY
Johnson and Kline
ATTORNEYS United States Patent Office 3,265,911
Patented August 9, 1966

3,265,911
LINEAR ELECTRIC MOTOR
Elmer W. Madsen, Bristol, Conn., assignor to The Superior Electric Company, Bristol, Conn., a corporation of Connecticut
Filed Jan. 27, 1964, Ser. No. 340,233
10 Claims. (Cl. 310—12)

The present invention relates to an electric motor that produces linear, reciprocating movement and more particularly to such a motor that produces a determinate linear incremental movement upon a change in an electrical circuit controlling the power to the motor.

While it has heretofore been proposed to provide an electric motor capable of producing linear movement, such devices have not been found completely satisfactory. Thus, in many instances, the motion produced upon actuation consisted only of the movement of the plunger from one extreme position to another without any control of the movement of the plunger inbetween these extremes. In other instances, while movement intermediate the extreme positions has been controllable, the length of movement capable of being controlled has been relatively large and such a motor could thus not provide determinate movement in small precise increments or steps.

It is accordingly an object of the present invention to provide an electric motor which overcomes the above disadvantages and is capable of being controlled to effect small incremental, linear movement or steps of precise length.

Another object of the present invention is to provide such a motor in which the plunger or actuated part may be incrementally moved in either direction and in which the actuated part may be held stationary to resist movement by exterior forces.

A further object of the present invention is to provide an electric motor of the above type with an electric circuit by which the movement of the actuated part may be controlled with changes in the electric circuit producing a positive determinate movement of the plunger.

Still another object of the present invention is to provide an electric motor and electric circuit which is extremely simple in design, composed of relatively few parts, durable in use and relatively economical to manufacture.

In carrying out the present invention, the electric motor is composed of a stator and a plunger or actuated part which is mounted for linear movement with respect to the stator and thus if the stator is maintained stationary, a linear force is thus obtainable from the plunger. In each of the embodiments of the invention hereinafter set forth, the stator is formed with at least two pole pieces that are spaced from each other and have a winding thereon by which the magnetic polarity of the pole piece may be changed by changing the energization of the winding. In addition, each pole piece has a surface adjacent the plunger with said pole surfaces being aligned with the movement of the plunger in such a manner that the surface is maintained a selected distance from the plunger as the latter moves.

In order to achieve the above-recited objects of the invention each pole surface is formed with at least two teeth to thus form a plurality of distinct magnetic poles which have the same magnetic polarity by reason of being integral with the same pole piece. The plunger is mounted for linear movement with respect to the stator, is spaced slightly from the pole surfaces for magnetically cooperating therewith and throughout its operating length is formed with teeth that cooperate with the teeth of the pole surfaces. A change in energization of the stator pole piece windings accordingly effects an incremental movement of the plunger which is a function of the pitch of the plunger teeth rather than being a function of the distance between the pole pieces. In this manner the present invention enables the pole pieces to be relatively widely spaced and be few in number but yet an incremental movement is achieved that is not a function of the wide spacing of the pole pieces.

The plunger in all embodiments of the invention hereinafter described is formed with equally spaced teeth and includes a permanent magnet that causes the teeth of the plunger to have a definite magnetic polarity that coacts with the magnetic field produced in the stator pole pieces. The plunger is caused to move upon a change in the polarity of the magnetization of the stator pole pieces a fraction of a tooth pitch of the plunger to thus produce an incremental movement of the plunger which is less than the distance between adjacent pole pieces.

Other features and advantages will hereinafter appear.

In the drawing:

FIGURE 1 is an elevation, partly in section, of one embodiment of the reciprocating electric motor of the present invention.

FIG. 2 is a section taken on the line 2—2 of FIG. 1.

FIG. 3 is a plan view of the stator means taken on the line 3—3 of FIG. 1 with the plunger removed.

FIG. 4 is a perspective view of a portion of the plunger.

FIG. 9 is a cross-section of another embodiment of a reciprocating electric motor of the present invention.

FIG. 10 is a view taken on the line 10—10 of FIG. 9.

Figure 5:
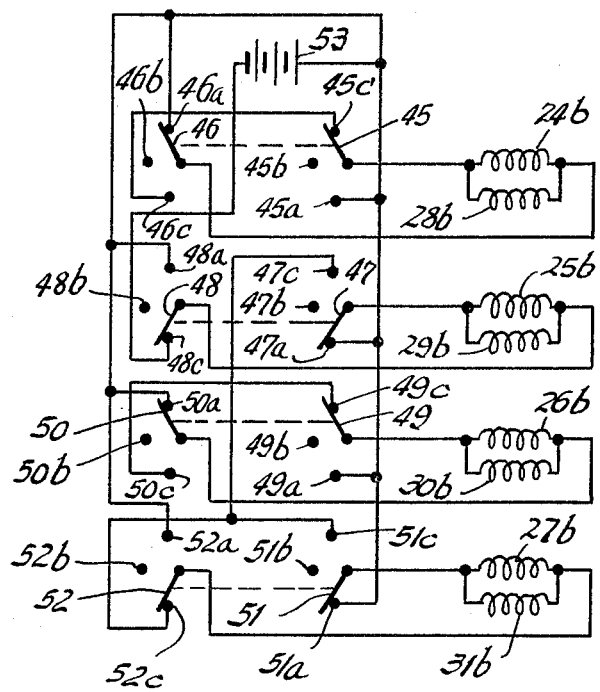
FIG. 5 is an electrical schematic diagram of an electrical control circuit therefor.

Referring to the drawing, the reciprocating electric motor of the present invention, shown in FIGS. 1–5 inclusive, is generally indicated by the reference numeral 20 and includes a stator means 21, a plunger 22 and a frame 23. The stator means 21 includes an elongate laminated block 21a formed of a plurality of flat strips 21b of paramagnetic material each being identical, to have the shape shown and being aligned and compressed together to form the unitary block 21a with sufficient strips being provided to produce the desired width. The shape of each strip 21b and hence the side of the block is shown in FIG. 1 and thus the block is formed to provide pole pieces 24, 25, 26, 27, 28, 29, 30 and 31. While there are eight pole pieces, in the specific embodiment of the motor 20 herein specifically described, it will of course be clear that a greater or lesser number may be employed if desired as set forth hereinafter.

All of the pole pieces are identical and specifically referring to the pole piece 24, it being appreciated that the other pole pieces will have the same structure, it has a narrow intermediate section 24a about which is positioned a winding 24b and an outer surface 24c on which a plurality of equally spaced teeth 24d are formed. The other pole pieces 25–31 inclusive are similarly constructed and thus have narrow sections 25a–31a, windings 25b–31b and teeth 25d–31d respectively.

The stator means 21 is mounted on a base 32 of the frame 23 that has a cutout 33 formed therein that receives the lower edge portions 34 of the block 21a. Bolts 35 extend through the base 32 and the laminations to secure the laminations together and to the base. Extending upwardly from the base 32 and secured thereto are a plurality of angle members 36 which carry at their upper end ball bearings 37. The ball bearings 37 support the plunger 22 by riding in grooves 38 formed in end members 39 of the plunger to thus support the plunger a determinate distance from the outer surfaces 24c through 31c of the stator pole pieces. In addition, for preventing vertical separation of the plunger 22 from the stator means 21 U-shaped straps 40 are secured to the base 32 and extend over the top of the plunger. The straps 40, end members 39, angle members 36, base 32 are formed from non-magnetizable material, such as brass or aluminum.

Shown in FIG. 4 is a length of the plunger 22 which is utilized with the stator means 21 and consists of the end members 39 together with soft iron pieces 41 and 42 and a center section composed of a permanent magnet 43. The magnet 43 is magnetized transverse to its length as indicated by the arrows 44 to magnetize the iron piece 41 S and the piece 42 N in the particular embodiment shown. Each of the iron pieces is provided with a surface 41a and 42a which defines a planar surface and on which teeth 41b and 42b are formed. These teeth have the same tooth pitch but however rather than have each tooth extend completely across the width of the plunger and be aligned in said direction, the teeth 41b are ½ a plunger tooth pitch out of alignment with the teeth 42b in the direction of travel of the plunger. If desired, however, the plunger teeth 41b and 42b may be aligned and the stator teeth be longitudinally split and be displaced transversely one-half a tooth pitch.

With the plunger 22 cooperating with the stator means 21 it will be understood that the motor will provide an incremental movement of ¼ of a plunger tooth pitch for each change of energization of the winding if the pole pieces are energized in the following manner wherein N indicates a north polarity and S indicates a south polarity:

| Pole Piece | 24 | 25 | 26 | 27 | 28 | 29 | 30 | 31 |
| --- | --- | --- | --- | --- | --- | --- | --- | --- |
| First Step | N | N | S | S | N | N | S | S |
| Second Step | S | N | N | S | S | N | N | S |
| Third Step | S | S | N | N | S | S | N | N |
| Fourth Step | N | S | S | N | N | S | S | N |
| First Step | N | N | S | S | N | N | S | S |

The control circuit schematically shown in FIG. 5 enables the windings to be manually energized in the above sequence so as to produce the polarity required though it will be understood that automatic equipment if desired may be utilized in place of the manual switching. In FIG. 5 the windings of the stator means are given the same reference number with the windings 28b through 31b wound to always produce the same polarity as the windings 24b through 27b respectively and accordingly are connected in parallel. Each of the windings 24b, 25b, 26b and 27b has each end connected to a switch arm and thus winding 24b is connected to switch arms 45 and 46, winding 25b to switch arms 47 and 48, winding 26b to switch arms 49 and 50 and winding 27b to switch arms 51 and 52 with the switch arms 45 and 46, 47 and 48, 49 and 50 and 51 and 52 being mechanically connected for simultaneous movement. Each of the switch arms cooperates with one of three contacts indicated by the reference characters 45a, 45b, 45c for the contacts associated with the switch arms 45, 46a, 46b and 46c for the contact associated with the switch arm 46 and so forth for the other switch arms. All the contacts indicated by a reference character having a suffix a are connected to the positive side of a battery 53 while all the contacts indicated by a reference character with a suffix c are connected to the negative side. In addition, all the contacts indicated by a reference character with a suffix b are each an open contact. When the even numbered switch arms are each engaging their contacts indicated by the reference character having the suffix a, and the odd numbered switch arms engaging their contact indicated by the reference character having a suffix c, then the windings produce an N polarity in their associate pole pieces while the switch arms when in their opposite position, produce an S magnetic polarity in their associated pole pieces. When the switch arms engage the contact indicated by a reference character having the suffix b the windings are not energized and hence the pole piece has no magnetization.

With the contacts 45c and 46a, 47c and 48a, 49a and 50c, 51a and 52c engaged by their respective switch arms, the stator pole pieces will be magnetized as shown in the first step of the above-noted table. This will cause the adjacent teeth 41b of the member 41 which are polarized S to attempt to line up with the magnetized N poles 24 and 25 so that teeth 41c and 41d substantially align with teeth 24e and 25e respectively. In addition on the further side of the stator means the plunger teeth 42b by reason of having the same polarity as the pole pieces 24 and 25 will attempt to become substantially ½ a tooth out of alignment by the repulsion due to like magnetic polarity. Further with respect to pole pieces 26 and 27, each of which is polarized S, they will force adjacent plunger teeth 41e and 41f on the piece 41 to be repelled by reason of like magnetic polarities to ½ a tooth pitch displacement while the teeth 42b opposite thereto will be attracted and hence will become substantially aligned with teeth 26e and 27e.

It will be understood as above mentioned that the plunger teeth 41b are displaced ½ a tooth pitch in the line of travel of the plunger 22 from the plunger teeth 42b though of identical pitch and that the stator pole piece 26 is displaced ½ a plunger tooth pitch from the stator pole piece 24 as is the stator pole piece 27 from the stator pole piece 25 by reason of there being a ¼ plunger tooth pitch differential displacement between adjacent pole pieces. Similarly, other teeth 41g and 41h of the plunger will have substantial alignment with the teeth of the pole pieces 28 and 29 and teeth 41i and 41j with the pole pieces 30 and 31.

Upon movement of the switch arms to have the following contacts engaged, 45a and 46c and 49c and 50a, with the other switch arms remaining in the previous position, the pole pieces will be magnetized to have the polarity indicated in the second step of the table. The plunger will then move ¼ of a plunger tooth pitch to attempt to substantially align plunger teeth 41d and 41e with the teeth 25e and 26e of the pole pieces 25 and 26 and substantially misalign, by ½ a plunger tooth pitch, adjacent plunger teeth 41f and 41g with the teeth 26e and 28e of the pole pieces 27 and 28. By shifting the switch arms 47, 48, 51 and 52 while leaving the switch arms 45, 46, 49 and 50 in the same position the polarity of the pole pieces required for the third step is achieved which causes adjacent teeth 41e and 41f to substantially align with the pole pieces 26 and 27 and produce another ¼ tooth incremental movement of the plunger. The switch arms 45, 46, 49 and 50 are again shifted for the fourth step to effect the ¼ tooth movement with the subsequent switching repeating the energization sequence; the four previous steps having caused the plunger to move one plunger tooth pitch.

By repeating this sequence of operation it will be understood that the plunger can then be advanced ¼ of a tooth pitch for each change in magnetization of the pole pieces. Moreover, if the manner of energization is reversed the plunger can be caused to move in the opposite direction. It is essential that each of the stator pole pieces for a ¼ incremental tooth pitch movement of the plunger be displaced along the path of travel of the plunger from its adjacent pole pieces by a differential of ¼ of a plunger tooth pitch. While this may be accomplished by having the stator and plunger tooth pitch the same, the present embodiment accomplishes the differential displacement by having a slightly different pitch between the stator and plunger teeth. Thus, in the same length the plunger is formed to have 25 teeth while the stator means is formed to provide only 24 stator teeth. In this manner each of the stator pole pieces may have identically tooth surfaces but yet the spacing between pole pieces equal to one and one half times the stator tooth pitch plus the ¼ plunger tooth pitch differential will automatically be produced.

However, while slightly different pitches between the stator and plunger teeth prevent exact alignment between the stator and plunger teeth when two adjacent pole pieces are magnetized, for example, teeth 41c and 25e and 42d and 26e or any of the other teeth when the motor is energized, such has not been found to be adverse to the operation of the motor as the plunger teeth at the two energized poles will assume a position of having the minimum reluctance path and hence proportion the difference equally therebetween. This has been found at times to produce a desirable movement of the plunger by decreasing the jerkiness of the plunger movement.

In the above-described embodiment of the invention the motor is basically a four-step motor because the pole pieces 28 through 31 are energized with the pole pieces 24 through 27. Thus whenever pole piece 24 is energized pole piece 28 is similarly energized to have the same magnetic polarity as are pole pieces 25 and 29, 26 and 30 and 27 and 31.

If desired, the same motor may be employed to produce an incremental movement of the plunger which is ⅛ of the plunger tooth pitch. Thus if the pole pieces are caused to have the following magnetic polarity by switching of the switch arms with a dash indicating no energization of the winding, i.e. a switch arm being in contact with the contact indicated by a reference character having the suffix b, then an eight step sequence as shown in the following table will produce a ⅛ plunger tooth pitch movement for each step:

| Pole Piece | 24 | 25 | 26 | 27 | 28 | 29 | 30 | 31 |
| --- | --- | --- | --- | --- | --- | --- | --- | --- |
| First Step | N | N | S | S | N | N | S | S |
| Second Step |  | N |  | S |  | N |  | S |
| Third Step | S | N | N | S | S | N | N | S |
| Fourth Step | S |  | N |  | S |  | N |  |
| Fifth Step | S | S | N | N | S | S | N | N |
| Sixth Step |  | S |  | N |  | S |  | N |
| Seventh Step | N | S | S | N | N | S | S | N |
| Eighth Step | N |  | S |  | N |  | S |  |
| First Step | N | N | S | S | N | N | S | S |

It will be appreciated that for the even numbered steps only four of the pole pieces are magnetized and hence the plunger teeth of unlike polarity as the pole pieces will attempt to be substantially aligned with the stator pole teeth while the like stator and plunger teeth will be substantially exact ½ tooth pitch out of alignment.

Figure 6:
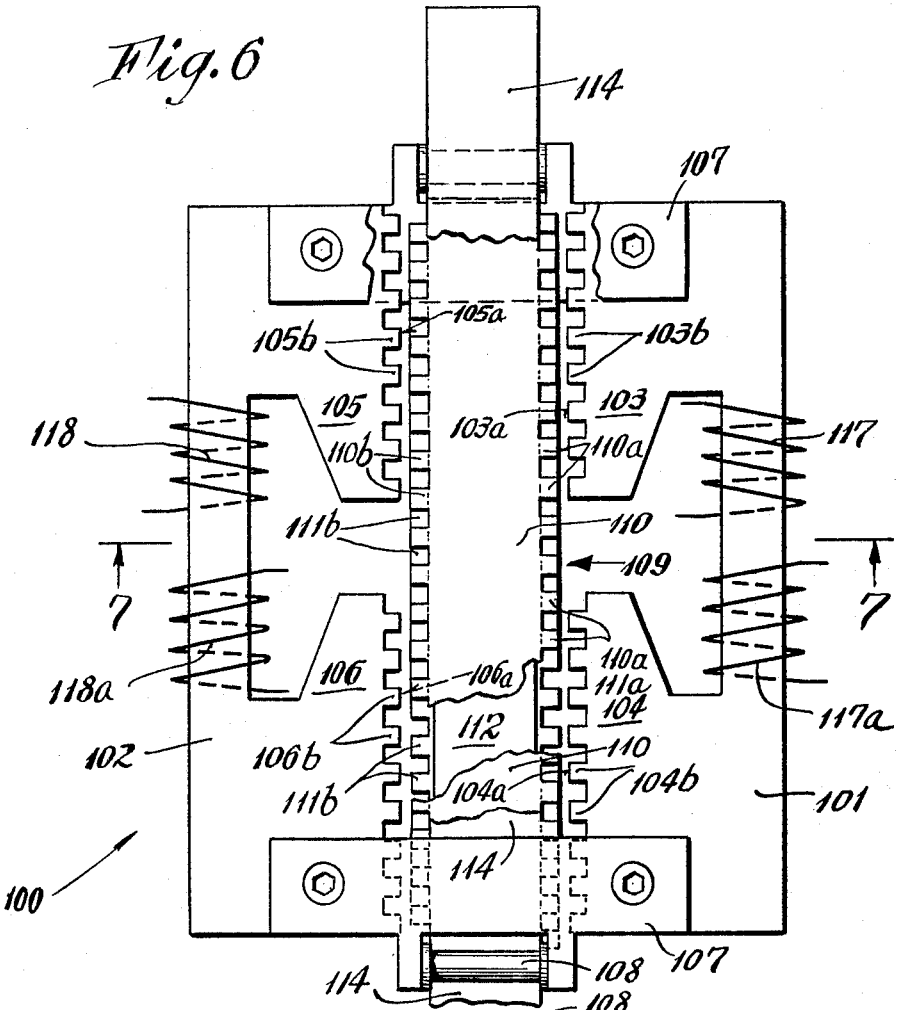
FIG. 6 is a pictorial representation, partly in section, of a further embodiment of a reciprocating electric motor of the present invention.
Figure 7:
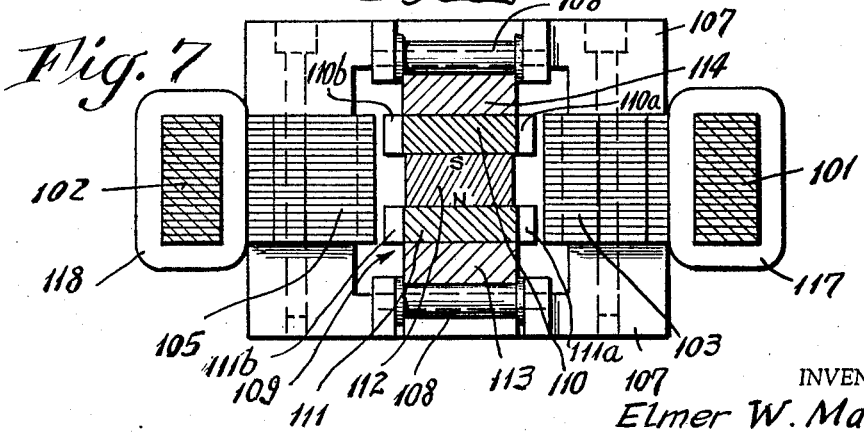
FIG. 7 is a section taken on the line 7—7 of FIG. 6.

Shown in FIG. 6 is a further embodiment of the present invention of a reciprocating motor in which rather than have the stator poles on one side of the plunger they are disposed on opposite sides of the plunger. In addition, in this embodiment of the motor two poles are magnetized by the same winding. Thus referring to FIGS. 6 and 7, the motor is generally indicated by the reference numeral 100 and includes a pair of C-shaped stacks of laminations 101 and 102 with the stack 101 forming pole pieces 103 and 104 and the stack 102 forming pole pieces 105, 106. The two pole stacks 101 and 102 are held in spaced apart relation by four brace members 107 (of non-magnetic material) each of which supports a bearing 108. Mounted for reciprocating movement with respect to the bearings is a plunger 109 formed of elongate tooth members 110 and 111 with permanent magnets 112 positioned therebetween. In addition, for cooperating with the bearings 108 the plunger includes plates 113 and 114 formed of non-magnetic material. The parts may be secured in any desired manner such as by screws (not shown) to form a unitary plunger.

Each of the pole pieces has a surface and referring specifically to the pole piece 103, the surface is denoted by reference character 103a and teeth 103b are formed therein. The other pole pieces 104, 105, 106 similarly have surfaces 104a, 105a and 106a formed with teeth 104b, 105b and 106b. Similarly the tooth members 110 and 111 are formed with teeth 110a and 110b and 111a and 111b formed on opposite sides of the members respectively. It will be appreciated that the surfaces 103a and 104a are parallel to and aligned with the planar surface defined by the teeth 110a and 111a while the surfaces 105a and 106a are parallel to and aligned with the planar surface defined by the teeth 110b and 111b with all surfaces thus being parallel. The teeth formed in all the pole pieces and the tooth members 110 and 111 are all equally spaced and all have the same constant pitch. However, teeth 103b of the pole piece 103 are differentially disposed ½ a tooth pitch from the teeth 104b along the path of travel of the plunger and are disposed transversely exactly opposite to the teeth 105b. Additionally, the teeth 105b are disposed ½ a tooth pitch from the teeth 106b, the latter being aligned with the teeth 104b. The teeth 110a on the tooth member 110 are displaced longitudinally, i.e. in the direction of movement of the plunger 109, ¼ of a tooth pitch from the teeth 110b as are the teeth 111a and 111b. Also the teeth 110a and 111a and 110b and 111b are displaced longitudinally ½ a tooth pitch from each other.

For magnetically polarizing the pole pieces the stack 101 has a pair of windings 117 and 117a while the stack 102 has a similar pair 118 and 118a. The winding 117 is wound oppositely on the stack 101 from the winding 117a and similarly the winding 118 is wound on the stack 102 oppositely from the winding 118a. It will thus be appreciated that when the winding 117 is energized pole piece 103 is polarized N with the pole piece 104 being S while when the winding 117a is energized pole piece 103 is an S and pole piece 104 an N. Similarly winding 118 renders pole piece 105 N and winding 118a renders it S with the pole piece 106 becoming S and N respectively.

Figure 8:
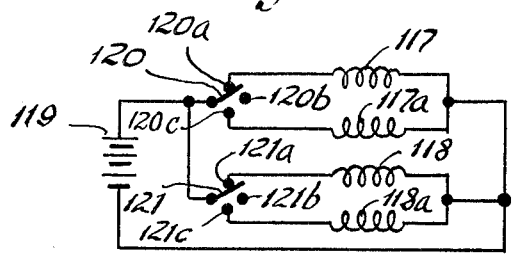
FIG. 8 is an electrical control circuit for the motor shown in FIGS. 6 and 7.

Referring to FIG. 8 which is an electrical schematic diagram for the control circuit of the motor 100, the windings are shown connected in parallel to a source of electrical energy 119. The other side of the source 119 is connected to switch arms 120 and 121, the former switch arm being movable into engagement with contacts 120a, 120b, 120c and the latter switch arm into engagement with contacts 121a, 121b, 121c. Thus by engagement of the switch arm 120 with contact 120a, winding 117 is energized producing the above-noted magnetic polarity of the pole pieces 103 and 104 while if the switch arm 120 is an engagement with the contact 120c, the winding 117a is energized producing the opposite polarity of said pole piece. Similarly, with respect to the switch arm 121, when engaging contact 121a it renders winding 118 energized and the pole piece 105 N while if in engagement with contact 121c, winding 118a is energized rendering the pole piece 105 S.

In the operation of the motor the pole pieces are magnetized in the following sequence to produce for each step an increment of movement equal to ¼ the tooth pitch of the stator:

| Pole Piece | 103 | 104 | 105 | 106 |
| --- | --- | --- | --- | --- |
| First Step | N | S | S | N |
| Second Step | S | N | S | N |
| Third Step | S | N | N | S |
| Fourth Step | N | S | N | S |
| First Step | N | S | S | N |

For the first step with the windings 117 and 118a energized, the teeth 110a will be substantially aligned with the teeth 103b and substantially ½ tooth pitch out of alignment with the teeth 104b while the teeth 110b will be substantially aligned with the teeth 105b and substantially 180 degrees out of alignment with the teeth 106b. Additionally, teeth 111a and 111b will be substantially aligned with teeth 104b and 105b and substantially ½ a tooth pitch out of alignment with teeth 103b and 106b. It will be appreciated that the teeth are not exactly aligned or exactly ½ a tooth pitch out of alignment because the teeth of member 110 are displaced ¼ of a tooth pitch from the teeth of member 111 and thus the teeth will proportion the difference between being substantially aligned with the teeth 103b and 105b and substantially ½ tooth pitch out of alignment with the teeth 104b and 106b. However, such misalignment is constant throughout and is in effect only ⅛ of the tooth pitch out of alignment when both stacks are magnetized and as this does not change, the length of each step remains constant.

For the next step, the winding 117a is energized changing the polarity of the pole pieces 103 and 104 while winding 118 is maintained energized and causing the plunger to move ¼ of a tooth pitch downwardly as the teeth 110a attempt to become aligned with the teeth 104b and are repelled by the teeth 103b. However, the poles 105 and 106 attempt to maintain the plunger with teeth 110b and 106b aligned and 110b and 105b out of alignment and hence rather than becoming exactly aligned and exactly out of alignment, the plunger moves ¼ of a tooth pitch to proportion the forces trying to have the teeth exactly aligned and exactly out of alignment. With the energization of the winding 118a and the maintenance of the winding 117a energized, the plunger again moves downwardly ¼ of a tooth pitch because teeth 106b are repelling and teeth 105b attracting teeth 110b while teeth 103b are repelling and teeth 104b attracting teeth 110a. For the fourth step, the winding 117a is deenergized and winding 117 energized causing the plunger to advance ¼ tooth pitch by the proportioning of the forces attempting to align teeth 103b and 110a and 105b and 110b and the repulsion between the teeth 104b and 110a and 106b and 110b. In this manner, by repeating the above-recited steps, the plunger is caused to incrementally step ¼ of a tooth pitch with each change of energization of the windings.

If desired the motor 100 may be caused to move ⅛ of a tooth pitch per change in energization if the poles are magnetized according to the following table:

| Pole Piece | 103 | 104 | 105 | 106 |
| --- | --- | --- | --- | --- |
| First Step | N | S | | |
| Second Step | N | S | S | N |
| Third Step | | | S | N |
| Fourth Step | S | N | S | N |
| Fifth Step | S | N | | |
| Sixth Step | S | N | N | S |
| Seventh Step | | | N | S |
| Eight Step | N | S | N | S |
| First Step | N | S | | |

The blanks in the above table indicate a lack of energization as when a switch arm engages contact 120b or 121b. Not only will the four steps above recited be caused to occur but intermediate the above-noted steps the magnetization of only one of the stacks 101 or 102 causes the exact alignment and misalignment of the teeth of the plunger adjacent said magnetized stack thereby producing the additional four steps in the above sequence that causes the plunger to move one tooth pitch in eight steps.

While the motor 100 has the plunger formed with teeth on opposite sides it will of course be appreciated that a motor, generally indicated by the reference numeral 130 shown in FIGS. 9 and 10, may be constructed with the teeth of the plunger on just one side. Accordingly, there is provided stacks 131 and 132 identical to stacks 101 and 102 with the stacks being parallelly mounted on a frame member 133. The frame supports ball bearings 134 which slide in grooves 135 formed in non-magnetic end members 136 of a plunger 137. The plunger further includes soft iron toothed members 138 and 139 that abut an elongate permanent magnet 140 polarized transversely of its length. The only difference between the motors 100 and 130, other than the frame for the stacks 131 and 132 and the plunger 137, is that the stacks and the end members of the plunger are arranged to be parallel instead of being opposite. Thus the stacks and end members have teeth which have a constant pitch and the relationship of the stack and end member teeth is maintained the same as that described in connection with the motor 100. Accordingly if the motor is energized by the sequences described in connection with the motor 100, it may cause the plunger to advance either ¼ or ⅛ of a tooth pitch for each change in energization.

It will be understood that in each embodiment of the motor herein described that while the steps thereof have been described to cause the plunger to move in one direction, that a reversal of the steps will cause the plunger to move in the other direction. Furthermore, if the winding energization is maintained constant, the plunger tends to resist movement from that position which the energization caused and hence the plunger in effect is magnetically braked against movement.

It will additionally be appreciated that in all embodiments of the invention, whether the pole pieces are located on the same side or on opposite sides of the plunger, that the pole pieces have their pole surfaces aligned with the path of travel of the plunger and are spaced apart along said path of travel.

While there has been disclosed a control circuit for each of the embodiments of the motors heretofore described, it is to be understood that other and different circuits, such as automatic circuits, may be employed if so desired provided they magnetize the pole pieces to cause the same changes in polarity of the pole pieces. As used herein, a change in magnetic polarity includes a change from a condition of magnetization of either polarity to a condition of no magnetization by the winding means and vice versa. It will also be understood that in the embodiments of the invention that where a part is magnetized constantly with the same polarity, such as produced by a permanent magnet, that if desired a continually energized magnetizing coil may be utilized in place of or in combination with the permanent magnet.

It will accordingly be appreciated that there have been disclosed embodiments of reciprocating electric motors in which a change in energization thereof causes an incremental linear movement. In all embodiments the motor has a plunger formed with teeth having a constant pitch and stator means formed to provide distinct pole pieces with each pole piece being formed with teeth having a constant pitch. By changing the polarity of magnetization of at least one of two adjacent pole pieces, the plunger is caused to move an incremental step related to its tooth pitch. The number of incremental steps required to advance the plunger one tooth pitch has been disclosed as being four or eight though it will be understood that the invention is not limited thereto but encompasses other incremental portions of the tooth pitch. While some embodiments of the motor have had pole pieces on only one side of the plunger and other embodiments on two sides, all embodiments however have adjacent pole pieces differentially disposed in the line of movement of the plunger a distance related to the number of steps of the plunger required to move one plunger tooth pitch.

Variations and modifications may be made within the scope of the claims and portions of the improvements may be used without others.

I claim:

1. A linear electric motor and control circuit for producing an incremental linear movement comprising a frame, stator means mounted on said frame and formed to provide at least two pole pieces, winding means magnetically associated with the pole pieces, each of said pole pieces having an outer pole surface that is formed with equally spaced teeth, an elongate plunger having at least one longitudinal plunger surface formed to provide equally spaced plunger teeth extending transversely of said surface, means mounting the plunger for reciprocating movement with respect to the stator means to have the plunger surface travel along a linear path with the plunger teeth extending transversely of the path, the pole surfaces being aligned and spaced along said path with the teeth of the pole surfaces extending transversely of said path with either each plunger tooth or each pole surface tooth being formed into two portions with one portion being longitudinally displaced one half a tooth pitch from the other portion and a control circuit adapted to be connected to a source of electrical energy and the winding means to change the magnetic polarity of at least one of said pole pieces to effect a linear movement of the plunger that is a fraction of the tooth pitch of the plunger teeth.

2. A linear electric motor and control circuit for producing an incremental linear movement comprising a frame, stator means mounted on said frame and formed to provide at least two pole pieces, winding means magnetically associated with the pole pieces, each of said pole pieces having an outer pole surface that is formed with equally spaced teeth, an elongate plunger having at least one longitudinal plunger surface formed to provide equally spaced plunger teeth extending transversely of said surface, means mounting the plunger for reciprocating movement with respect to the stator means to have the plunger surface travel along a linear path with the plunger teeth extending transversely of the path, the pole surfaces being aligned along said path with the teeth of the pole surfaces extending transversely of said path and being spaced to have a tooth of one pole surface and a tooth of the plunger being oppositely aligned while a similar tooth of the other pole surface is a fraction of the plunger tooth pitch misaligned from an oppositely disposed plunger tooth with either each plunger tooth or each pole surface tooth being formed into two portions with one portion being longitudinally displaced one half a tooth pitch from the other portion and a control circuit adapted to be connected to a source of electrical energy and the winding means to change the magnetic polarity of at least one of said pole pieces to effect a linear movement of the plunger that is the fraction of the tooth pitch of the plunger teeth.

3. A linear electric motor and control circuit for producing an incremental linear movement comprising a frame, stator means mounted on said frame and formed to provide at least three pole pieces, winding means magnetically associated with the pole pieces, each of said pole pieces having an outer pole surface that is formed with equally spaced teeth, an elongate plunger having at least one longitudinal plunger surface formed to provide equally spaced plunger teeth extending transversely of said surface, each plunger tooth being formed into two portions with one portion being longitudinally displaced one half a tooth pitch from the other portion, means for causing a similar portion of each tooth to have one magnetic polarity and each of the other portions of each tooth to have the opposite magnetic polarity, means mounting the plunger for reciprocating movement with respect to the stator means to have the plunger surface travel along a linear path with the plunger teeth extending transversely of the path, the pole surfaces being aligned along said path with the teeth in the pole surfaces extending transversely of said path and said pole surfaces being equally spaced to have a tooth of one pole surface be oppositely aligned with a tooth of the plunger and with a similar tooth of the next pole surface being a fraction of the plunger tooth pitch misaligned from an oppositely disposed plunger tooth and with a similar tooth of the third pole surface being twice the fraction of the plunger tooth pitch misaligned from an oppositely disposed plunger tooth and a control circuit adapted to be connected to a source of electrical energy and the winding means to change the magnetic polarity of at least one of said pole pieces to effect a linear movement of the plunger that is the fraction of the tooth pitch of the plunger teeth.

4. The invention as defined in claim 3 in which the plunger is formed with a second longitudinal plunger surface formed with equally spaced teeth extending transversely of the path with the tooth pitches of the teeth of the first and second plunger surfaces being identical.

5. The invention as defined in claim 4 in which the teeth of the second plunger surface and first-mentioned plunger surface are misaligned a fraction of a plunger tooth pitch.

6. The invention as defined in claim 3 in which the control circuit energizes the winding means to cause two adjacent pole pieces to have opposite magnetic polarity and the change in energization of the winding means causes the polarity of the pole pieces to be reversed.

7. The invention as defined in claim 3 in which the control circuit energizes the winding means to cause two adjacent pole pieces to have the same magnetic polarity and the change in energization of the winding means causes the magnetic polarity of the one pole piece to change to the opposite polarity while maintaining the same magnetic polarity of the other pole piece.

8. The invention as defined in claim 3 in which the control circuit energizes the winding means to cause two adjacent pole pieces to each have a magnetic polarity and the change in energization causes one pole piece to be free of magnetization by the winding means and maintain the same magnetic polarity of the other pole piece.

9. The invention as defined in claim 3 in which the winding means consists of an independent single winding for each pole piece.

10. The invention as defined in claim 3 in which the winding means for at least one of the pole pieces includes two windings wound in different directions whereby the energization of one causes the pole piece to have one magnetic polarity and energization of the other causes the pole piece to have the opposite magnetic polarity.

References Cited by the Examiner
UNITED STATES PATENTS 3,162,796   12/1964   Schreiber et al. _____ 310—12 XR

OTHER REFERENCES

IBM Technical Disclosure Bulletin, volume 6, Number 9, February 1964.

MILTON O. HIRSHFIELD, *Primary Examiner.*

D. F. DUGGAN, *Assistant Examiner.*